United States Patent [19]

Chalupa et al.

[11] Patent Number: 5,597,604
[45] Date of Patent: Jan. 28, 1997

[54] GELLAN GUM BEVERAGE AND PROCESS FOR MAKING A GELLED BEVERAGE

[75] Inventors: William F. Chalupa, Aurora, Ill.; Alan H. King, Westfield; Donald A. Giampetro, Cherry Hill, both of N.J.

[73] Assignee: Monsanto Company, St. Louis, Mo.

[21] Appl. No.: 524,447

[22] Filed: Sep. 6, 1995

Related U.S. Application Data

[63] Continuation of Ser. No. 265,082, Jun. 24, 1994, abandoned.

[51] Int. Cl.$^6$ .................................................... A23L 1/05
[52] U.S. Cl. .................... 426/590; 426/271; 426/518; 426/519; 426/520; 426/573; 426/594
[58] Field of Search .................... 426/271, 518, 426/519, 520, 573, 590, 594

[56] References Cited

U.S. PATENT DOCUMENTS

| | | |
|---|---|---|
| 3,619,205 | 11/1971 | Levan et al. . |
| 3,736,149 | 5/1973 | Knapp et al. . |
| 4,326,052 | 4/1982 | Kang et al. . |
| 4,326,053 | 4/1982 | Kang et al. . |
| 4,503,084 | 3/1985 | Baird et al. ............................. 426/271 |
| 4,980,193 | 12/1990 | Tuason, Jr. et al. . |
| 5,190,778 | 3/1993 | Clare et al. ............................. 426/573 |
| 5,306,519 | 4/1994 | Peterson et al. ....................... 426/271 |
| 5,338,561 | 8/1994 | Campbell et al. ..................... 426/573 |

OTHER PUBLICATIONS

Developmental Product Bulletin RC–180, Kelco Polymers in Beverage Products, pp. 1–7, 1993 Merck & Co. Inc.

*Primary Examiner*—Helen Pratt
*Attorney, Agent, or Firm*—Jeffrey M. Hoster

[57] ABSTRACT

A stable, pourable gelled beverage containing gellan gum. A process for preparing a gelled beverage which involves dispersing gellan gum and other beverage ingredients in solution agitating the solution, heating the solution while stirring, and concurrently rapidly cooling and shearing the solution. The beverage, which does not require the presence of other gelling agents or stabilizers, contains between about 0.01% and 0.15% gellan gum.

12 Claims, No Drawings

GELLAN GUM BEVERAGE AND PROCESS FOR MAKING A GELLED BEVERAGE

This is a continuation of U.S. application Ser. No. 08/265,082 filed Jun. 24, 1994 now abandoned.

BACKGROUND OF THE INVENTION

Many commercially available beverages are unstable over a period of time and require stabilizing additives to maintain beverage homogeneity over an extended period of time. Citrus juices, for example, contain pulp material which remain suspended over a period of time only with the assistance of additives such as propylene glycol alginates or other food additives known to stabilize and/or thicken. Beverages containing powder additives such as cocoa powder also require suspending agents to prevent premature settling.

In the past, hydrocolloids such as gum arabic, xanthan gum, pectin, starch and modified starch, and carboxymethylcellulose have been used to stabilize beverages. Relatively large quantities of these materials are required in order to achieve an effective degree of stabilization. While stabilizing the beverage, these materials unfortunately affect beverage flavor and feel. Sometimes, as with xanthan gum, the beverage stabilizing material reacts with other beverage components, including proteins (such as milk proteins or beer proteins), affecting beverage flavor and stabilizer efficacy.

McGinley, et al., U.S. Pat. No. 4,980,193, describes a stabilizing agent which is useful as a rapid dispersing agent for suspending solids in an aqueous medium, which contains colloidal microcrystalline cellulose, starch, and a non-thickening water soluble diluent such as maltodextrin, whey or non-fat dry milk.

The present invention is a stable, pourable beverage containing gellan gum.

SUMMARY OF THE INVENTION

The invention is a beverage comprising between about 0.01% and 0.15 % gellan gum. In one embodiment of the invention, the amount of gellan gum in the beverage is between about 0.03% and 0.12%, and the beverage additionally comprises a sequestrant. In another embodiment, the amount of gellan gum in the beverage is between about 0.03% and 0.10%, and the beverage additionally comprises a sequestrant.

The invention is also a process for preparing the beverage which comprises:

a) blending gellan gum, one or more sequestrants, and one or more dry ingredients selected from sugar, milk solids, flavorings and colorings;

b) dispersing the blend in an aqueous solution and agitating the solution;

c) heating the mixture, e.g. to between about 140° F. and 212° F. for about 5 to 15 minutes while stirring; and d) concurrently rapidly cooling, e.g. to between about 40° F. and 59° F., and shearing the mixture.

The invention is a gelled beverage comprising between about 0.01% and 0.15% gellan gum. In one embodiment of the invention, the amount of gellan gum in the gelled beverage is between about 0.03% and 0.12%, and the beverage additionally comprises a sequestrant. In another embodiment, the amount of gellan gum in the gelled beverage is between about 0.03% and 0.10%, and the beverage additionally comprises a sequestrant.

The invention is also a process for preparing a gelled beverage which comprises:

a) blending gellan gum, one or more sequestrants, and one or more dry ingredients selected from sugar, milk solids, flavorings and colorings;

b) dispersing the blend in an aqueous solution and agitating the solution;

c) heating the mixture, e.g. to between about 140° C. and 212° C., while stirring to hydrate the gellan gum;

d) filling the heated beverage composition in a beverage container; and e) cooling the mixture.

DETAILED DESCRIPTION OF THE INVENTION

The invention is a stable, pourable beverage containing gellan gum which does not require stabilizers. The amount of gellan gum present in the beverage is between about 0.01% and 0.15% gellan gum. The beverage can be prepared by hot-filling or shear cooling.

Shear cooling is a procedure used to prepare fluid gels. Shear cooling is used in the production of custards, gravies, and chocolate milk, in which fluid mass is formed during homogenization, pasteurization and cooling. Chocolate milk, for example, is processed with carrageenan under high temperature, short time pasteurization, and then shear cooled.

During cooling, a gel matrix forms. Simultaneous shearing, sufficient to break the gel matrix, breaks the gel. At the end of the shearing and cooling operations, the resulting product is a cooled, non-gelled product.

The procedure of shear cooling a gellan gum beverage involves blending dry beverage ingredients, e.g. sugar, flavorings, colorings, dry milk products, sequestrants, e.g. sodium citrate, sodium tripolyphosphate, sodium hexametaphosphate, EDTA, trisodiumpolyphosphate, with gellan gum, and dispersing them with good agitation into liquid beverage ingredients, e.g. water or cold milk. The resulting dispersion is heated for about 5–15 minutes, depending on ingredient types and amounts, to enhance mixing and induce gellan gum hydration. The mixture is then cooled while stirring over a period of time between 5 and 15 minutes. Rapid heating and cooling can be conducted using plate heat exchangers.

Beverages produced by shear cooling are fluid gels having low viscosity and excellent suspension properties. They do not require shaking prior to consumption.

Hot-filling is a procedure whereby beverage ingredients are mixed and hydrated prior to cooling, and filled in a container at a temperature above the beverage gel point. When the filled product cools, a gel network forms.

The procedure of hot filling a gellan gum beverage involves blending dry beverage ingredients, e.g. sugar, flavorings, colorings, dry milk products, sequestrants, e.g. sodium citrate, sodium tripolyphosphate, sodium hexametaphosphate, EDTA, trisodiumpolyphosphate, with gellan gum, and dispersing them with good agitation into liquid beverage ingredients, e.g. water or cold milk. The resulting dispersion is heated for about 5–15 minutes, depending on ingredient types and amounts, to enhance mixing and induce gellan gum hydralion. The gellan gum beverage is filled prior to cooling. After cooling, a gel network forms.

Prior to consumption, hot-filled gelled beverages need to be shaken, e.g. 3–5 times, to break the gel formed after cooling, or else consumed using a straw and straw suction.

Gellan gum beverages have a unique mouthfeel, body, and flavor release properties which distinct from mouthfeel, body and flavor release obtained with beverages prepared with non-gelling hydrocolloids such as carboxymethylcellulose, xanthan gum, and polyethylene glycol alginates. Such non-gelling hydrocolloids are thickeners which linger in the mouth longer than a shattered gellan gum gel matrix.

Beverages which can be prepared with gellan gum include lemonade beverages, fruit beverages, alcohol beverages, and coffee beverages. Gellan gum beverages can be prepared from concentrated flavor systems containing gellan gum, including frozen concentrate systems such as apple, orange, pineapple, daiquiri, or highly concentrated shelf stable flavor systems used by beverage processors.

Beverages containing blends of the invention display rheological properties of a weak gel system when measured using dynamic viscoelastic measurements. One characteristic of a gelled system is a constant elastic (storage) modulus over a range of strain values up to a critical strain value, at which critical strain value the modulus drops significantly.

Gellan gum is a heteropolysaccharide prepared by fermentation of *Pseudomonas elodea* ATCC 31461. Gellan gum is available from Kelco Division of Merck & Co., Inc., San Diego, Calif., under various names, including KELCOGEL, KELCOGEL PC, and KELCOGEL F. Processes for preparing gellan gum include those described in U.S. Pat. Nos. 4,326,052 and 4,326,053. It is useful for a variety of gelling, texturizing, stabilizing and film forming applications, particularly as a gelling agent in foods, personal care products and industrial applications.

Typical pH modifiers, such as citric acid or maleic acid, sweeteners, such as natural and artificial sweeteners, preservatives, such as sodium benzoate, flavorings such as flavor emulsion oil bases, other common beverage additives such as sodium citrate and ascorbic acid, and colorings, may also be added to beverages of the present invention.

KELCOGEL F gellan gum was used in the following examples.

EXAMPLE 1

Lemonade Gellan Beverage

Country Time Lemonade as packaged (without gellan gum)

Lemonade was prepared according to the package directions. 37.50 grams of Country Time Lemonade dry mix was added to and mixed in 2 cups (472 grams) of water, without heat. The finished product was thin and had little mouthfeel. Brookfield LVF viscosity measurement (UL adapter, 12 rpm) was 1.75 cPs at 40° F. and 1.50 cPs at 70° F.

Country Time Lemonade with gellan gum 1 gram of KELCOGEL F gellan gum was added to 461.50 grams of water and heated in a microwave oven to boiling. 37.50 grams of Country Time Lemonade dry mix was added while maintaining boiling. The mixture was thoroughly mixed while cooling to 70° F., and then poured into sterilized jars. The finished product had better mouthfeel. Brookfield LVF viscosity measurement (UL adapter, 12 rpm) was 29 cPs at 40° F. and 26 cPs at 70° F.

EXAMPLE 2

Orange Juice Gellan Beverage 30 grams of KELCOGEL F gellan gum was hydrated in 150 grams of orange juice, and heated to boiling in a microwave. 420 grams of orange juice was heated to 130°–140° F. and then combined with the microwaved mixture and stirred. The combination was split into two equal portions. One half of the combination was then allowed to set while cooling to room temperature without mixing, and the other half was sheared while cooling to room temperature.

Both halves were stored at 40° F. overnight. The half which was allowed to set without mixing gelled with a good cuttable texture. The half which was sheared foamed and stabilized with a mousse type texture.

EXAMPLE 3

Screwdriver Gellan Beverage 30 grams of KELCOGEL F gellan gum was hydrated in 150 grams of orange juice, and heated to boiling in a microwave. 243 grams of orange juice was heated to 130°–140° F. and then combined with the microwaved mixture and stirred. The combination was split into two equal portions. 100 grams of vodka was heated to 120° F. and added to one of the portions, mixed thoroughly, and then cooled while stirring. The other portion was cooled to room temperature while stirring, and 100 grams of vodka was added thereafter.

Both portions were stored at 40° F. overnight. The portion which was shear cooled following vodka addition was stable with thin viscosity. The portion which was shear cooled prior to vodka addition had slight separation.

EXAMPLE 4

Orange Gellan Beverage with Pulp

KELCOGEL F gellan gum was used to suspend fruit pulp in an orange beverage without significantly increasing beverage viscosity. A beverage with the following formulation was prepared:

| Ingredients | grams | wt. % |
| --- | --- | --- |
| Water | 440.4640 | 88.0928 |
| Sugar, fine granular | 55.5490 | 11.1098 |
| Citric acid, anhydrous | 2.5490 | 0.5098 |
| Orange pulp cells | 1.0000 | 0.2000 |
| KELCOGEL F gellan gum | 0.2000 | 0.0400 |
| Sodium citrate dihydrate | 0.1335 | 0.0267 |
| Orange oil, Two Fold, Valencia Cold Pressed | 0.0850 | 0.0170 |
| FD & C Yellow #6 | 0.0120 | 0.0024 |
| FD & C Yellow #5 | 0.0075 | 0.0015 |

Procedure:
1. Combine sugar, KELCOGEL F gellan gum, sodium citrate, and colors and dry blend uniformly.
2. Add dry blend from step #1 to water with agitation.
3. Continue mixing and heat system to boiling.
4. Add citric acid and continue mixing.
5. Cool mixture to 100° F. while shearing/mixing, then add orange oil and pulp.

6. Continue to cool mixture to room temperature (70° F.) while shearing/mixing.
7. Pour into sterilized jars and seal.

EXAMPLE 5

The following procedure was used to prepare 7 tea, apple juice, orange and canned coffee beverage gels (A–G) with sodium citrate and with sodium citrate in combination with calcium lactate. The table indicates amounts in weight %.

Gellan gum and citrate were added to a flavored beverage and heated to 176°–185° F. with agitation. For beverages with calcium lactate, calcium lactate was added to the hot solution. The solutions were cooled rapidly in an ice bath to 40°–59° F. The beverages had a unique mouthfeel which was preferred over xanthan gum and carboxymethylcellulose.

| Ingredient | A | B | C | D | E | F | G |
|---|---|---|---|---|---|---|---|
| KELCOGEL F | 0.05 | 0.05 | 0.10 | 0.10 | 0.05 | 0.05 | 0.10 |
| Sodium citrate | 0.05 | 0.05 | 0.05 | 0.05 | 0.05 | 0.07 | 0.05 |
| Calcium lactate | — | 0.07 | — | 0.07 | — | 0.07 | — |
| Chinese tea | 99.9 | 99.83 | — | — | — | — | — |
| Clarified apple juice | — | — | 99.85 | 99.78 | — | — | — |
| Orange juice | — | — | — | — | — | — | 99.85 |
| Canned, ready-to-drink coffee | — | — | — | — | 99.9 | 99.83 | — |

EXAMPLE 6

Fruit Gel Beverage

Gellan gum was used to prepare a fruit gel beverage without significantly increasing beverage viscosity. A beverage with the following formulation was prepared:

| Ingredients | wt. % |
|---|---|
| Part 1 | |
| Water | 47.30 |
| Sucrose | 10.00 |
| Citric acid, anhydrous | 0.25 |
| KELCOGEL F gellan gum | 0.04 |
| Calcium lactate | 0.05 |
| Sodium citrate dihydrate | 0.06 |
| Part 2 | |
| Fruit juice | 42.30 |

Preparation

Blend together sucrose, citric acid, KELCOGEL F gellan gum, calcium lactate and sodium citrate dihydrate and dissolve into boiling water with continuous stirring. Add the fruit juice to part 1 and deposit into suitable containers and allow to cool. The resulting product is a weakly gelled product which can be consumed through a straw due to the product becoming liquid on suction.

EXAMPLE 7

Coconut Gel Beverage

Gellan gum was used to prepare a coconut gel beverage without significantly increasing beverage viscosity. A beverage with the following formulation was prepared:

| Ingredients | wt. % |
|---|---|
| Water | 69.88 |
| Coconut milk powder | 15.00 |
| Sugar | 15.00 |
| KELCOGEL F gellan gum | 0.06 |
| Trisodium citrate dihydrate | 0.06 |

Preparation

Blend together sugar, coconut milk powder, KELCOGEL F gellan gum, and trisodium citrate dihydrate and dissolve into boiling water with continuous stirring. Deposit into suitable containers and allow to cool. The resulting product is a weakly gelled product which can be consumed through a straw due to the product becoming liquid on suction.

EXAMPLE 8

Coffee Gel Beverage

Gellan gum was used to prepare a coffee gel beverage without significantly increasing beverage viscosity. A beverage with the following formulation was prepared:

| Ingredients | wt. % |
|---|---|
| Semi-skimmed milk | 82.85 |
| Sucrose | 16.00 |
| Milled coffee | 1.00 |
| KELCOGEL F gellan gum | 0.10 |
| KELTROL xanthan gum | 0.05 |

Preparation

Blend together sucrose, milled coffee, KELCOGEL F gellan gum, and KELTROL xanthan gum. Add to milk and agitate. Heat to 185° F. with continued stirring. Remove the coffee flavored milk from the heat and aerater with a hand held electric fan for 2 minutes. Deposit into suitable containers and allow to cool. The resulting product is a gelled product which can be consumed following shaking to break the gel matrix.

KELTROL xanthan gum is available from Kelco Division of Merck & Co., Inc., San Diego, Calif.

EXAMPLE 9

Honey/Apple Gel Beverage

Gellan gum was used to prepare a honey/apple gel beverage without significantly increasing beverage viscosity. A beverage with the following formulation was prepared:

| Ingredients | wt. % |
|---|---|
| Part 1 | |
| Water | 47.30 |
| Honey | 10.00 |
| Apple juice | 32.30 |
| Sucrose | 10.00 |
| KELCOGEL F gellan gum | 0.09 |
| Sodium citrate dihydrate | 0.06 |
| Part 2 | |
| Water | 5.00 |
| Citric acid anhydrous | 0.25 |
| Calcium lactate pentahydrate | 1.00 |

Preparation

Part 1 Blend together sucrose, KELCOGEL F gellan gum, and sodium citrate dihydrate and disperse into water heated at 185° F. until fully hydrated. Heat the honey and apple juice to 122° F. and add to the gellan gum solution.

Part 2 Dissolve the citric acid calcium lactate pentahydrate into the water and mix thoroughly with Part 1. Deposit into suitable containers and allow to cool. The resulting product is a gelled product which can be consumed following shaking to break the gel matrix.

We claim:

1. A beverage comprising between about 0.01% and 0.15% low acyl gellan gum, wherein said beverage has the rheological properties of a gel system when measured using dynamic viscoelastic measurements and the viscosity of a non-gelled beverage.

2. A beverage of claim 1 comprising between about 0.03% and 0.12% gellan gum and a sequestrant.

3. A beverage of claim 2 comprising between about 0.03% and 0.10% gellan gum and a sequestrant.

4. A beverage of claim 3 comprising between about 0.03% and 0.10% gellan gum, a sequestrant, and lemonade.

5. A beverage of claim 3 comprising between about 0.03% and 0.10% gellan gum, a sequestrant, and fruit juice.

6. A beverage of claim 3 comprising between about 0.03% and 0.10% gellan gum, a sequestrant, and alcohol.

7. A beverage of claim 3 comprising between about 0.03% and 0.10% gellan gum, a sequestrant and coffee.

8. A process for preparing a beverage of claim 1 which comprises:

a) blending gellan gum, one or more sequestrants, and one or more dry ingredients selected from the group consisting of sugar, milk solids, flavorings and colorings;

b) dispersing the blend in an aqueous solution and agitating the solution;

c) heating the solution for about 5 to 15 minutes while stirring; and d) concurrently rapidly cooling and shearing the mixture.

9. A process of claim 8 which comprises heating the mixture in step c) to between about 140° F. and 212° F.

10. A process of claim 8 which comprises cooling the mixture in step d) to between about 40° F. and 59° F.

11. A process for preparing a gelled beverage of claim 1 wherein said beverage has the rheological properties of a gel system when measured using dynamic viscoelastic measurements and the viscosity of a non-gelled beverage which comprises:

a) blending gellan gum, one or more sequestrants, and one or more dry ingredients selected from the group consisting of sugar, milk solids, flavorings and colorings;

b) dispersing the blend in an aqueous solution and agitating the solution;

c) heating the mixture while stirring to hydrate the gellan gum;

d) filling the heated beverage composition in a beverage container;

e) cooling the mixture to form a gel matrix which has the rheological properties of a gel system when measured using dynamic viscoclastic measurements and the viscosity of a non-gelled beverage.

12. A process of claim 11 which comprises heating the mixture in step c) to between about 140° F. and 212° F.

* * * * *